US012578450B2

(12) United States Patent
Koppelaar et al.

(10) Patent No.: US 12,578,450 B2
(45) Date of Patent: Mar. 17, 2026

(54) METHOD AND APPARATUS FOR DETERMINATION OF DIRECTION OF ARRIVAL ANGLE

(71) Applicant: NXP B.V., Eindhoven (NL)

(72) Inventors: Arie Geert Cornelis Koppelaar, Giessen (NL); Marco Jan Gerrit Bekooij, Empel (NL)

(73) Assignee: NXP B.V., Eindhoven (NL)

( * ) Notice: Subject to any disclaimer, the term of this patent is extended or adjusted under 35 U.S.C. 154(b) by 293 days.

(21) Appl. No.: 18/469,949

(22) Filed: Sep. 19, 2023

(65) Prior Publication Data

US 2024/0118404 A1      Apr. 11, 2024

(30) Foreign Application Priority Data

Sep. 27, 2022    (EP) ..................................... 22198193

(51) Int. Cl.
 *G01S 13/42* (2006.01)
 *G01S 7/35* (2006.01)
 *G01S 13/00* (2006.01)

(52) U.S. Cl.
 CPC .............. *G01S 13/42* (2013.01); *G01S 7/352* (2013.01); *G01S 13/006* (2013.01)

(58) Field of Classification Search
 CPC ........ G01S 13/42; G01S 7/352; G01S 13/006; G01S 3/06; G01S 3/48; G01S 13/4454;
(Continued)

(56) References Cited

U.S. PATENT DOCUMENTS

2018/0329709 A1    11/2018   Meinl
2020/0225337 A1*    7/2020   Kishigami ................ G01S 7/41
(Continued)

FOREIGN PATENT DOCUMENTS

DE      102012105582 A1    1/2013
WO        2021197875 A1    10/2021

OTHER PUBLICATIONS

Cai, X., "Autonomous Vehicles: MMW Radar Backscattering Modeling of Traffic Environment, Vehicular Communication Modeling, and Antenna Designs", Doctoral dissertation, Oct. 4, 2020.

(Continued)

*Primary Examiner* — William Kelleher
*Assistant Examiner* — Ismaaeel A. Siddiquee

(57)        ABSTRACT

An apparatus configured to:

receive an input dataset indicative of radar signals, reflected from targets, received at an antenna;

determine an objective function for evaluation over a plurality of points of a search space representing possible direction-of-arrival angles;

evaluate the objective function for a first candidate number of targets;

perform a first evaluation of a branch metric function based on a second candidate number of targets, wherein the branch metric function is indicative of a change in the objective function; and if the branch metric function is greater than a predetermined threshold, then evaluate the objective function for the second candidate number of targets;

if the branch metric function is less than the predetermined threshold, then evaluate the objective function for the first candidate number of targets, wherein the evaluation is based on at least one of the first candidate number of targets having a different, second candidate direction-of-arrival angle.

19 Claims, 3 Drawing Sheets

(58) Field of Classification Search
CPC ........ G01S 13/931; G01S 7/358; G01S 13/34;
G01S 7/356
See application file for complete search history.

(56) References Cited

U.S. PATENT DOCUMENTS

| | | | |
|---|---|---|---|
| 2021/0270925 A1* | 9/2021 | Dougherty | ................ G01S 3/06 |
| 2023/0152435 A1 | 5/2023 | Koppelaar et al. | |
| 2024/0118404 A1* | 4/2024 | Koppelaar | .............. G01S 13/42 |

OTHER PUBLICATIONS

Emtiyaz, M., Updating inverse of a Matrix When a Column is Added/Removed, https://emtiyaz.github.io/Writings/OneCollnv.pdf (Accessed Apr. 11, 2022), Feb. 28, 2008.
Hacker, P., "Single Snapshot DoA Estimation", Adv. Radio Sci., 8, pp. 251-256, Oct. 2010.
Heidenreich, P., "Antenna Array Processing: Autocalibration and Fast High-Resolution Methods for Automotive Radar", Ph.D. Thesis, TU Darmstadt, Jun. 2012.
Liu, Z., et al., "Implementation of the RELAX Algorithm", IEEE Transactions on Aerospace and Electronic Systems vol. 34, No. 2, Apr. 1998.
Meinl, F., "Hardware Acceleration of Maximum-Likelihood Angle Estimation for Automotive MIMO Radars", 2016 Conference on Design and Architectures for Signal and Image Processing (DASIP). IEEE, Oct. 12-14, 2016.
Westhues, C., "Low-Complexity Super Resolution Angle Separation for Sparse Antenna Arrays Based on Frequency Domain Maximum Likelihood". IEEE Radar Conference, Mar. 21-25, 2022.
Wikipedia, "Gaussian Elimination", https://en.wikipedia.org/wiki/Gaussian_elimination (Accessed Apr. 19, 2022).
Wikipedia, https://en.wikipedia.org/wiki/Moore-Penrose_inverse, Section: Applications, Linear least-squares, retrieved from the internet Aug. 2, 2023.
Wikipedia, "Sequential decoding", https://en.wikipedia.org/wiki/Sequential_decoding (Accessed Apr. 12, 2022), retrieved from the internet Aug. 2, 2023.
Wikipedia, "Viterbi decoding", https://en.wikipedia.org/wiki/Viterbi_decoder (Accessed Apr. 14, 2022), retrieved from the internet Aug. 2, 2023.

* cited by examiner 501   502   503

METHOD AND APPARATUS FOR DETERMINATION OF DIRECTION OF ARRIVAL ANGLE

CROSS-REFERENCE TO RELATED APPLICATIONS

This application claims the priority under 35 U.S.C. § 119 of European Patent application no. 22198193.9, filed on 27 Sep. 2022, the contents of which are incorporated by reference herein.

FIELD

The present disclosure relates to an apparatus and method for determining the directions of arrival angles for each of a plurality of targets in a dataset indicative of radar signals received at an antenna array. In particular, it relates to the use of Deterministic Maximum Likelihood techniques. The disclosure also relates to a radar system, such as a frequency-modulated-continuous-wave, FMCW, radar system configured to perform said method.

BACKGROUND

Deterministic Maximum-Likelihood (DML) Direction-of-Arrival (DoA) estimation is a technique for determination of the directions of arrival angles of component radar signals reflected from each of a plurality of targets in radar signals received at a plurality of antenna elements. The antenna elements may be part of a FMCW radar.

SUMMARY

According to a first aspect of the present disclosure there is provided an apparatus comprising a processor configured to:
- receive an input dataset indicative of the amplitude and phase of radar signals received at a plurality of antenna elements, wherein the radar signals have reflected from an unknown number of targets;
- determine an objective function, based on the input dataset, for evaluation over a plurality of points of a search space, the points of the search space representing possible direction-of-arrival angles of said radar signals from the plurality of targets and wherein evaluation of the objective function is indicative of the correspondence between the possible direction-of-arrival angles of said plurality of targets and the input dataset;
- evaluate the objective function for a first candidate number of targets K, wherein each target of the first candidate number of targets has a respective first candidate direction-of-arrival angle each corresponding to a point in the search space;
- perform a first evaluation of a branch metric function based on a second candidate number of targets (K+1) comprising one more target than the first candidate number of targets, wherein the branch metric function is indicative of a change in the objective function between an evaluation of the objective function based on the first candidate number of targets having the first candidate direction-of-arrival angles and an evaluation of the objective function based on the second candidate number of targets, and comprises a function of the respective first candidate direction-of-arrival angles of the first candidate number of targets; and

if the branch metric function is greater than a predetermined threshold $\lambda$, then the processor is configured to:
- evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising an additional-target having an additional-target-first-candidate direction-of-arrival angle;

if the branch metric function is less than the predetermined threshold $\lambda$, then the processor is configured to:
- evaluate the objective function for the first candidate number of targets K, wherein the evaluation is based on at least one of the first candidate number of targets K having a different, second candidate direction-of-arrival angle.

In one or more embodiments, predetermined threshold $\lambda$ is based on the candidate number of targets.

In one or more embodiments, the objective function is formulated such that the evaluation of the objective function for the first candidate number of targets K comprises a function of two or more sub-functions, and
wherein the branch metric function comprises a function of at least one of the two or more sub-functions and an additional-target beamsteering vector, the additional-target beamsteering vector representing the expected response at the plurality of antenna elements of the additional-target at the additional-target-first-candidate direction-of-arrival angle.

In one or more embodiments, the processor is configured to, if the branch metric function is less than the predetermined threshold $\lambda$, not evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising the additional-target having the additional-target-first-candidate direction-of-arrival angle and any other direction-of-arrival angle in the search space.

Thus, in one or more examples, the search for additional targets in combination with the first candidate direction-of-arrival angles is terminated.

In one or more embodiments, the branch metric function is also a function of the additional-target-first-candidate direction-of-arrival angle (the angle represented by $\underline{a}_{K+1}$), comprising the angle of said one more target than the first candidate number of targets,
wherein the additional-target-first-candidate direction-of-arrival angle comprises any angle in the search space.

In one or more embodiments, when the branch metric function is less than the predetermined threshold $\lambda$ and the processor has evaluated the objective function for the first candidate number of targets K, wherein the evaluation is based on at least one of the first candidate number of targets K having a different, second candidate direction-of-arrival angle;
the processor is configured to:
- re-evaluate the branch metric function based on the second candidate number of targets (K+1) comprising one more target than the first candidate number of targets, wherein the branch metric function is a function of the candidate direction-of-arrival angles of the targets of the evaluated objective function comprising those that changed to said different, second candidate direction-of-arrival angle and those that remained as the first candidate direction-of-arrival angles.

In one or more embodiments, the processor is configured to, as part of said evaluation of the objective function for the first candidate number of targets K and the first evaluation of the branch metric function:

determine a beamsteering matrix, A, of beamsteering vectors wherein each beamsteering vector represents a respective one of the first candidate number of targets K and wherein each beamsteering vector comprises a function that represents the expected response at the plurality of antenna elements from radar signals of unit amplitude reflected from a respective one of the targets at a respective one of the first candidate direction-of-arrival angles;

determine a sub-function B wherein $B=(A^H A)^{-1}$ determine a sub-function $\underline{y}$, wherein $\underline{y}=A^H \underline{x}$ and $\underline{x}$ represents the input dataset and wherein $\underline{y}$ represents a correlation of the input dataset with the beamsteering vectors of the beamsteering matrix;

define the additional-target having the additional-target-first-candidate direction-of-arrival angle as a beamsteering vector, $\underline{a}_{K+1}$;

calculate $\underline{c}$ wherein $\underline{c}=B\, A^H \underline{a}_{K+1}$;

calculate $d$, wherein $$d = \frac{1}{\underline{a}_{K+1}^H \underline{a}_{K+1} - \underline{a}_{K+1}^H ABA^H \underline{a}_{K+1}};$$

calculate z, wherein $z=\underline{y}^H \underline{c}$;

and wherein the branch metric function comprises $d(|z|^2 - 2\mathrm{Re}\{zy_{K+1}\}+|y_{K+1}|^2)$ and is compared to the predetermined threshold.

In one or more embodiments, the processor is additionally configured to, if the branch metric function is greater than the predetermined threshold $\lambda$:

calculate $\tilde{A}=[A\ \underline{a}_{K+1}]$ comprising the beamsteering matrix for the second candidate number of targets and for use in a subsequent calculation of the branch metric function;

calculate $$\tilde{B} = \begin{bmatrix} B + d\underline{c}\,\underline{c}^H & -d\underline{c} \\ -d\underline{c}^H & d \end{bmatrix}$$

for use in a subsequent calculation of the branch metric function; and calculate $\tilde{\underline{y}}^H=[\underline{y}^H y*_{K+i}]$ for use in a subsequent calculation of the branch metric function.

In one or more embodiments, the processor is configured to output a final set of direction-of-arrival angles comprises the direction-of-arrival angles that resulted in the one of the maximal and minimal evaluation of the objective function.

In one or more examples, the evaluation of the objective function comprises the repeated evaluation of the objective function for a plurality of candidate matrices based on matrix A that each include different direction-of-arrival-angle vectors over the respective search space, wherein said set of direction of arrival angles are derived from one of the candidate matrices of the plurality of candidate matrices that provides one of a maximum and a minimum evaluation of the objective function over the search space.

In one or more embodiments, the apparatus comprises a frequency-modulated-continuous-wave, FMCW, radar system.

In one or more embodiments, the input dataset comprises a dataset that has been Range-Doppler processed such that the input dataset is representative of radar signals that have reflected from targets at a predetermined range of distances from the antenna elements and a predetermined range of radial velocities relative to the antenna elements.

In one or more examples, such a determination of the objective function comprises determining an objective function based on a beam forming method, as will be familiar to those skilled in the art.

In one or more examples, one of:

the objective function is formulated such that the greater the value obtained upon its evaluation, the greater the probability that the possible direction-of-arrival angles used in its evaluation are those that resulted in the receipt of the input dataset and wherein said evaluation of the objective function in the first evaluation process and the second evaluation process is configured to maximize the objective function; and the objective function is formulated such that the lesser the value obtained upon its evaluation, the greater the probability that the possible direction-of-arrival angles used in its evaluation are those that resulted in the receipt of the input dataset and wherein said evaluation of the objective function in the first evaluation process and the second evaluation process is configured to minimize the objective function.

According to a second aspect of the disclosure we provide a method for evaluating an objective function, the method, performed by a processor, comprising:

receiving an input dataset indicative of the amplitude and phase of radar signals received at a plurality of antenna elements, wherein the radar signals have reflected from an unknown number of targets;

determining an objective function, based on the input dataset, for evaluation over a plurality of points of a search space, the points of the search space representing possible direction-of-arrival angles of said radar signals from the plurality of targets and wherein evaluation of the objective function is indicative of the correspondence between the possible direction-of-arrival angles of said plurality of targets and the input dataset;

evaluating the objective function for a first candidate number of targets K, wherein each target of the first candidate number of targets has a respective first candidate direction-of-arrival angle each corresponding to a point in the search space;

performing a first evaluation of a branch metric function based on a second candidate number of targets (K+1) comprising one more target than the first candidate number of targets, wherein the branch metric function is indicative of a change in the objective function between an evaluation of the objective function based on the first candidate number of targets having the first candidate direction-of-arrival angles and an evaluation of the objective function based on the second candidate number of targets, and comprises a function of the respective first candidate direction-of-arrival angles of the first candidate number of targets; and if the branch metric function is greater than a predetermined threshold $\lambda$:

evaluating the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising an additional-target having an additional-target-first-candidate direction-of-arrival angle;

if the branch metric function is less than the predetermined threshold λ:

evaluating the objective function for the first candidate number of targets K, wherein the evaluation is based on at least one of the first candidate number of targets K having a different, second candidate direction-of-arrival angle.

In one or more embodiments, the objective function is formulated such that the evaluation of the objective function for the first candidate number of targets K comprises a function of two or more sub-functions, and wherein the branch metric function comprises a function of at least one of the two or more sub-functions and an additional-target beamsteering vector, the additional-target beamsteering vector representing the expected response at the plurality of antenna elements of the additional-target at the additional-target-first-candidate direction-of-arrival angle.

In one or more embodiments, the processor is configured to, if the branch metric function is less than the predetermined threshold λ, not evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising the additional-target having the additional-target-first-candidate direction-of-arrival angle and any other direction-of-arrival angle in the search space.

According to a third aspect of the disclosure we provide a non-transitory computer readable medium comprising computer program code configured to, when executed, perform the method of the second aspect.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 6 shows a flowchart illustrating an example method; and

FIG. 7 shows an example computer readable medium.

DETAILED DESCRIPTION

Figures 1, 2, 3, 4:
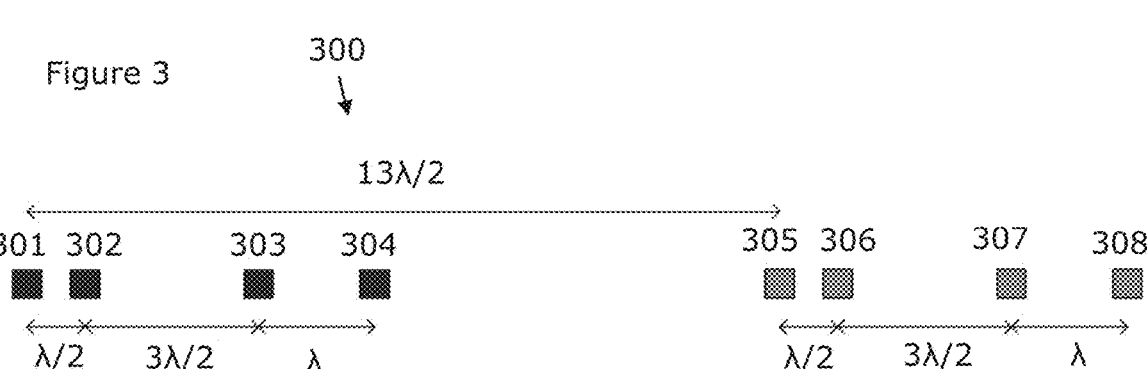
FIG. 1 shows an example embodiment of an apparatus and a FMCW system.
FIG. 2 shows an example embodiment of a pair of antenna elements illustrating a direction of arrival angle.
FIG. 3 shows an example embodiment of a plurality of antenna elements, wherein the antenna elements may be true antenna elements or virtual antenna elements or a combination.
FIG. 4 shows an example embodiment of the same distribution of antenna elements as FIG. 3 but projected on a uniform grid with spacing between the antenna elements of λ/2.

FIG. 1 shows an example embodiment of a FMCW system 100. The system comprises an apparatus 101, which may comprise a processor 102, for processing data indicative of radar signals 104 received by an antenna array 103. The radar signals 104 may comprise reflections from one or a plurality of targets 105, 106.

The antenna array 103 comprises a plurality of antenna elements 107-111. One or more of the antenna elements may be configured to transmit radar signals, which may comprise a FMCW chirp 112, that will reflect from the targets 105, 106. Two or more of the antenna elements 107-111 may be configured to receive the reflected radar signals 104A, 104B from the targets 105, 106.

Radar systems, such as FMCW among others, has many applications and may be used in the automotive field to detect targets in the neighbourhood of the vehicle with the objective to make driving safer and more comfortable. Distance to the target(s) 105, 106 and the relative velocity of the target(s) can be estimated. The use of several antenna elements 107-111 to transmit and receive radar signals allows for the direction in which this target is present to be determined and it is typically represented as an angle relative to a direction of the antenna elements.

The reflected radar signal 104A from the first target 105 has a direction of arrival angle of $\theta_1$ at the antenna elements 107-111. The reflected radar signal 104B from the second target 106 has a direction of arrival angle $\theta_2$ at the antenna elements 107-111. However, the radar signals 104 as received by the antenna elements 107-111 comprises a combination of the signals 104A and 104B and noise. It will also be appreciated that the direction of arrival angle may represent the angle of arrival of the reflected radar signals 104A, 104B in one or both of an azimuth angle and an elevation angle.

It is necessary to processes the received radar signals to determine, optionally, the number of targets (if not known or otherwise determined) and the direction of arrival angles $\theta_k$ of K targets, which in this example comprise $\theta_1$ and $\theta_2$.

Deterministic Maximum-Likelihood (DML) Direction-of-Arrival (DoA) estimation is a known process for determining the most likely (including likely) angles from which the radar signals 104A, 104B are received to create the observed combination of radar signals 104 as received by the antenna elements 107-111.

The transmitted radar signals are reflected by the target(s) 105, 106 and received by the receive antenna elements of the radar system 100 and, depending on the direction of arrival angle of the reflected wave(s) $\theta_1$ and $\theta_2$, different path-lengths between a transmit antenna element(s), targets 105, 106 and receive antenna elements are realised, leading to phase differences in the received radar signals between the antenna elements. Analysis of these phase differences is carried out to estimate the direction of arrival angle of the target(s).

Direction of arrival angle estimation based on data from the antenna array 103 is an important matter for radar systems 100. If the radar signals received originate from one target 105, the signal strength at the antenna elements 107-111 is substantially identical but due to path length differences between antenna elements 107-111 and target 105 the phase of the radar signal will be different and is a function of the direction of arrival angle.

FIG. 2 shows two example antenna elements, which may comprise antenna elements 107 and 108 receiving the radar signal 104A. The path length difference is given by d sin θ where d is the antenna element spacing and θ is the direction-of-arrival angle.

When multiple targets 105, 106 are reflecting, a linear combination of these signals will be received. Because of the linear combination, both the amplitude and the phase per antenna element 107-111 will vary and has to be used to estimate the DoA angles of the targets 105, 106.

In practice the number of targets 105, 106 is unknown and has to be estimated as well. In one or more examples, data from the antenna array 103 can be pre-processed to analyse the space in which the targets are located.

Using radar signals, such as FMCW radar signals, one can use the known technique of Range-Doppler processing to quantize the received signal in Range and Doppler shift (i.e. frequency change). For each Range-Doppler combination for which one has detected energy (above a threshold), one can carry out the DoA estimation. The Range-Doppler pre-processing separates targets on the basis of their distance from the antenna array 103 and their velocity (Doppler) and therefore the number of targets per Range-Doppler bin is expected to be low. The properties of the FMCW signal determine how fine the radar scene is quantized in Range and Doppler. With an appropriate designed radar system it is reasonable to assume that having one target present in the radar data of one Range-Doppler bin is more likely than having two present in the radar data of one Range-Doppler bin, and 2 targets more likely than 3 targets etc. In known examples, therefore, it is typical for the algorithm used to solve the DoA problem to start with searching first for only one target over the range of DoA angles, then for all the combinations of DoA angles for two targets, then for all the combinations of DoA angles three targets, etc. When each of these searches indicates how well the found candidate DoA's match with the received radar data signals then one can stop searching for more targets if the match with the received signal is sufficiently close (e.g. above a threshold level of confidence). Noise in the radar system is a reason why an exact match is unlikely to happen. Since noise power is estimated in radar systems, a threshold may be derived to evaluate the match.

Deterministic Maximum Likelihood DoA estimation is a technique that for a given number of targets can determine what the most likely DoA angles are and what their match is to the received radar signal. In one or more examples, the DML algorithm may be configured to find the DoA angles that maximizes the match with the received radar data. In case a K-target search with DML finds a match that is too poor (e.g. below a threshold level of a match) on the basis of the known noise properties, then one proceeds with a (K+1)-target search with DML. λ DML search for (K+1) targets is more complex than a search for K targets. Therefore, in a practical implementation one has to stop after a certain K because of limitations in computing resources to search for more targets. Moreover, system imperfections (amplitude and phase distortions, noise) also limits the number of targets one successfully can estimate. In one or more examples a practical value for K is therefore from 1 to 2 or 1 to 3 or 1 to 4 or 1 to 5 potential targets.

DoA estimation may be carried out for each Range-Doppler bin for which sufficient energy is detected. In a rich radar scene this means that DoA estimation may have to be carried out many times within a system cycle. For that reason it is important that the corresponding complexity of the DoA estimation process is low.

DoA estimation starts with the radar signals received at the antenna elements or, more particularly, an input dataset representing the reflected radar signals received at the antenna elements 107-111. The input dataset can be represented collectively with an N-dimensional vector $\underline{x}=(x_1, \ldots, x_N)^T$, which is often called a snapshot, and wherein T stands for transpose, such that $\underline{x}$ is a column vector. The number of antenna elements is N. During a system cycle, radar signals received by the apparatus 101 may comprise data representative of the received signals at each of the antenna elements 107-111. In one or more examples, during a system cycle, radar signals received by the apparatus may comprise input datasets or snapshots extracted from one or more Range-Doppler bins. In one or more examples, DoA estimation may be carried out only for those Range-Doppler bins that contain radar signals having an energy above a certain threshold. Thus, the following process can be performed on the input dataset whether or not Range-Doppler processing has been performed.

A signal received from a target at DoA angle $\theta_1$ will result in a response at the antenna elements 107-111. That response has constant amplitude and a phase relation between the antenna elements that is specific for the DoA angle $\theta_1$ and the relative positions of the antenna elements 107-111. The response can be denoted with a vector: $\underline{a}_1=\underline{a}(\theta_1)$. When at least two antenna elements have a distance ≤λ/2, and the DoA angle θ may be between −90 and 90 degrees, any two single target responses will be different and therefore the DoA angle of a single target response can be unambiguously determined. For multiple, say K targets, the antenna response will be a linear combination of K single target responses, i.e.

$$\underline{x}=\sum_{k=1}^{K}s_k a_k+n,$$

where $\underline{n}$ represents additive noise, and $s_k$ represent the complex amplitude of the targets and $\underline{x}$ represents an input dataset representing the radar signals received at the antenna elements 107-111, and $\underline{a}_k$ (comprises a vector (known in that art as a beamsteering vector) and comprises a function of the DoA, wherein $$\underline{a}^T_n=(e^{j2\pi(d_1/\lambda)sin\,\theta_n},e^{j2\pi(d_2/\lambda)sin\,\theta_n},\ldots e^{j2\pi(d_N/\lambda)sin\,\theta_n})$$

and $(d_1, \ldots, d_N)$ are the relative positions of the antenna elements or virtual antenna elements. The vector $\underline{a}_n$ carries the relative phase behaviour among the antenna elements due to pathlength difference of a planar wave originating from an angle $\theta_n$. Put another way, a beamsteering vector represents the expected response at the antenna elements of a single target or one of a plurality of targets with unit amplitude and comprises a function of Direction-of-Arrival angle.

FIG. 3 shows an example antenna array 300 with antenna elements 301-308 separated by distances d of different fractions of the operating wavelength. For example, the antenna array 300 may be configured to operate according to a MIMO scheme for which the positions of the two virtual antenna elements 301, 305 are indicative of the positions of the transmitters and are separated by $13\lambda/2$, and the virtual antenna elements 301, 302, 303, 303 are indicative of the receive array with antenna spacing $(0, 1, 4, 6)\lambda/2$, that in this specific example forms a Minimum Redundancy Array. Together they form a virtual antenna array with relative element positions $(d_1, \ldots, d_8)=(0, 1, 4, 6, 13, 14, 17, 19)\lambda/2$. Thus, in one or more examples, the antenna array 300 may comprise a combination of true and virtual antenna elements depending on the configuration of the antenna array. In other examples, the antenna array 300 may comprise all true antenna elements, i.e. the scenario in which the radar system will use one transmitter 301 antenna and eight receive antennas 301-308. Thus, the term antenna element can refer to true (real) antenna elements as well as virtual antenna elements.

The processing performed by the apparatus is based on the aforementioned input dataset. The input dataset may be from a Range-Doppler bin if the optional Range-Doppler processing is performed.

λ general description of DML-DoA determination will be provided followed by embodiments of the example embodiment apparatus 101.

Thus, to summarise, an input dataset or snapshot is represented with a vector $\underline{x}$. The snapshot represents the amplitude and phase of the reflected radar signals received at the N antenna elements 107-111. If Range-Doppler processing is applied, the snapshot may comprise the reflected radar signals received at the N antenna elements extracted from a Range-Doppler bin, as will be familiar to those skilled in the art. Furthermore, we assume that K targets are present in a snapshot (e.g. K targets are contained in one Range-Doppler bin) with respective, possible DoA angles $\theta_1, \theta_2, \ldots, \theta_K$. The K targets can be represented with a beamsteering matrix A consisting of K beamsteering vectors $(\underline{a}_1, \ldots, \underline{a}_K)$. As mentioned above, a beamsteering vector is the expected response of single target with unit amplitude and is given by:

$$\underline{a}^T{}_n=(e^{j2\pi(d_1/\lambda)\sin\theta}{}_n, e^{j2\pi(d_2/\lambda\sin\theta}{}_n, \ldots, e^{j2\pi(d_N/\lambda\sin\theta_n)}),$$

where $(d_1, \ldots, d_N)$ are the relative positions of the antenna elements (which may be real antenna elements or a combination of real and virtual antenna elements, as will be familiar to those skilled in the art).

A signal amplitude vector $\underline{s}$ represents the complex amplitudes of the individual targets. Furthermore we assume that the snapshot is corrupted by antenna noise and that the noise is identical and independent distributed zero-mean Gaussian with variance $\sigma^2$. Hence, $\underline{x}=A\underline{s}+\underline{n}$. Because of the Gaussian noise assumption, one can write the joint probability density function of the snapshot as $$p(\underline{x}) = \frac{1}{\pi^N\sigma^{2N}}e^{-\frac{|x-As|^2}{\sigma^2}} \text{ with } (\underline{n} = \underline{x} - A\underline{s})$$

The Maximum-Likelihood (ML) estimate of $\underline{s}$ and A can be found by minimizing (mathematically, the maximization can be solved by differentiating $\log(p(\underline{x}))$ with respect to $\underline{s}$ and by requiring equality to zero)

$$Q=|\underline{x}-A\underline{s}|^2$$

To solve this equation, that is find the K most likely DoA angles to the targets and their complex amplitude, a bootstrapping approach may be followed.

Assuming that A is known, that is to propose a candidate set of beamsteering vectors represented as A, one can find $\underline{s}$ by minimizing Q in the least square sense:

$$\underline{s}=(A^HA)^{-1}A^H\underline{x}$$

This result is substituted back into the expression for Q. Hence, as will be familiar to those skilled in the art, after some mathematical formatting one obtains $$Q=\underline{x}^H(I-\pi_A)\underline{x}, \text{ where } \pi_A=A(A^HA)^{-1}A^H$$

This matrix $\pi_A$ is called the projection onto the column space of A. Since, the beam-steering matrix A is a function of the K beamsteering vectors that represent the candidate DoA angles $\theta=\theta_1, \theta_2, \ldots, \theta_K$, the DML problem can now be formulated as the search for a K-dimensional vector $\theta$ $$\theta_{DML}=\arg\min_\theta Q$$

An equivalent notation for Q is using the trace operator (Tr( )) and therefore Q is given by:

$$Q=\underline{x}^H(I-\pi_A)\underline{x}=Tr((I-\pi_A)\underline{x}^H\underline{x})$$

This form enables the generalization to estimating the DoA angles using multiple snapshots.

By using the sample covariance matrix $\hat{R}=E[\underline{x}^H\underline{x}]$ one obtains $$Q=Tr((I-\pi_A)\hat{R})$$

Instead of minimizing Q, the DML criterion can also be formulated as a maximizing criterion:

Single snapshot: $\theta_{DML}=\arg\max_\theta\underline{x}^H\pi_A\underline{x}=\arg\max_\theta Tr(\pi_A\underline{x}^H\underline{x})$ Multi snapshot: $\theta_{DML}=\arg\max_\theta Tr(\pi_A\hat{R})$ In these expressions the DML objective function is equal to:

$$f(\pi_A,\underline{x})=\underline{x}^H\pi_A\underline{x}=Tr(\pi_A\underline{x}^H\underline{x})$$

or in case of multiple snapshots:

$$f(\pi_A,\hat{R})=Tr(\pi_A\hat{R}))$$

The use of the matrix $\pi_A$ leads to a compact notation for the DML criterion.

As preparation for the DML algorithm one may start with the definition of an e.g. 1-Dimensional search space (although the principle can be extended to 2-Dimensional search spaces) that has a granularity (i.e. points in the search space) that reflects the resolution and/or the wanted accuracy.

One can select $N_\theta$ discrete points in the range $[-\pi/2, \pi/2]$. As will be understood, if the desired field-of-view is smaller one can select accordingly a smaller search space, such as with fewer discrete points over the narrow angular range. Thus, each point in the search space corresponds, such as by way of a function, to a direction-of-arrival angle.

With such a search space or grid of points and the search for K possible targets, the search space has size $$N_K = \binom{N_\theta}{K}.$$

E.g. with the search for K=2 targets and a grid of size $N_\theta$=256 the number of discrete points to be investigated is equal to $N_K = \frac{1}{2}N_\theta(N_\theta-1) \sim 2^{15}=32$ k.

We now provide a coarse outline of the DML algorithm.

Coarse DML Algorithm Outline

For n=1:$N_K$,

Select A=($\underline{a}_1, \ldots, \underline{a}_K$) i.e. a set of candidate direction-of-arrival angles Calculate $\pi_A = A(A^H A)^{-1} A^H$ (projection operator signal space)

Evaluate DML objective function $f(\pi_A, \underline{x})$ (or $f(\pi_A, \hat{R})$)

End

In this for-loop the lines Select, Calculate and Evaluate can be considered an "inner loop", which is performed for each target. Note that in this for-loop the search for K targets, making it a K-dimensional search, is not shown for clarity. That is, here it is shown as a 1-dimensional loop, but in a more general case, there are K nested loops. Each loop represents one dimension of the K-dimensional search space.

As the algorithm progresses, different combinations of Direction-of-Arrival angles are input to the beamsteering vectors and the objective function evaluated. Thus, as each candidate set of beamsteering vectors as represented by the beam-steering matrix is selected, one has to keep track of the maximum value (or minimum depending on how the objective function is formulated) of the DML objective function. Thus, each index n is uniquely associated with a set of candidate beamsteering vectors and therefore also with a set of K candidate DoA angles for each of the possible targets. The index n for which the DML objective function is maximal (or above a threshold) determines the Maximum-Likelihood estimate of the DoA of the K targets. Likewise, depending on how the objective function is formulated the index n for which the DML objective function is minimal (or below a threshold) may determine the Maximum-Likelihood estimate of the DoA of the K targets.

As will be appreciated by those skilled in the art, the evaluation of the objective function may involve performing a correlation with the beamsteering vectors, as will be described in more detail below. In general, for a non-uniform linear array the correlation with all beamsteering vectors on the grid may be carried out using a zero-padded FFT of size $N_\theta$.

FIG. 4 shows the same antenna elements (including virtual antenna elements) projected on a uniform grid with antenna element spacings of $\lambda/2$. This projection shows how data representative of the radar signals extracted from the (virtual) antenna elements can be inserted in a vector of values that can be analysed using Fourier transform processing, such as FFT. FIG. 4 also illustrates the generation of an zero-value inserted input dataset that has length $N_\theta$ wherein $N_\theta$ represents the number of discretized points of the search space. The zero-value inserted input dataset is thus derived from the input dataset indicative of the reflected radar signals received at the antenna elements 301-308 and includes said added zero-valued entries. The zero-valued insertion may be needed when we have a non-uniform linear antenna element array, i.e. the virtual antenna elements are at locations that are multiples of $\lambda/2$, but not at every multiple of $\lambda/2$ a virtual antenna is present as shown in FIG. 4. In example FIG. 4 we have antenna elements at positions {0, 1, 4, 6, 13, 14, 17, 19}$\times\lambda/2$, Hence, there are no antenna elements present at positions {2, 3, 5, 7, 8, 9,10, 11, 12, 15, 16, 18}$\times\lambda/2$. It is at these positions that the zero-valued entries are inserted.

In one or more examples zero-value insertion may be performed to pad the input dataset to the predetermined number of entries by adding zero-valued entries in the input dataset at positions after the data indicative of the radar signals. Thus, the padding may be performed because we want to evaluate the objective function at $N_\theta$ direction-of-arrival angles. Using FFT for performing a correlation, one can do this efficiently by extending the input dataset (e.g. vector) $\underline{x}$ using zero-valued entries at the locations {20, 21, . . . , $N_\theta$-1}$\times\lambda/2$.

FFT can be used to obtain a correlation that forms part of the assessment of the objective function. It has the advantage that when a non-uniform grid of DoA angles is tested, there is a more dense grid for DoA's around $\theta$=0 and a less dense grid for DoA's around $\theta = \pm\pi/2$. In FIG. 4, it is shown how the snapshot of a 2×4 MRA MIMO array (Minimum Redundancy Array Multiple-input Multiple-output) has to be provided to a FFT. A 2×4 MRA MIMO radar array leads to a non-uniform virtual array with 8 elements. As mentioned above, this virtual array has virtual elements at relative positions $(d_1, \ldots, d_8)$=(0, 1, 4, 6, 13, 14, 17, 19)$\lambda/2$. The FFT can also be used to increase the density of the search grid by appending zeros after the last antenna element. A typical choice for the FFT length is $N_\theta$=256, such that the output of the FFT represents the correlation of the snapshot with $N_\theta$=256 beamsteering vectors.

Embodiments of the processes performed by the apparatus 100 will now be described.

Recall that the DML objective function is equal to:

$$f(\pi_A, \underline{x}) = \underline{x}^H \pi_A \underline{x}, \text{ with } \pi_A = A(A^H A)^{-1} A^H$$

Hence, one can also write the DML objective function as:

$$f(\pi_A, \underline{x}) = \underline{x}^H A(A^H A)^{-1} A^H \underline{x} = \underline{y}^H (A^H A)^{-1} \underline{y}, \text{ where } \underline{y} = A^H \underline{x}.$$

The interpretation of $\underline{y} = A^H \underline{x}$ is that $\underline{y}$ is the correlation of the snapshot with K beamsteering vectors. With this interpretation, the following steps can be defined to reduce the complexity of the inner-loop (that is the Select, Calculate, Evaluate steps recited above):

Step 1: One can calculate the correlation of the snapshot with all beamsteering vectors on the grid outside the inner-loop and select K correlation values on request in the inner-loop to construct $\underline{y}$. With this approach, the correlation of the snapshot with a beamsteering vector is done once outside the loop.

Step 2: By selecting an appropriate 1D search grid (or greater dimension search grid), the correlation with all beamsteering vectors on the grid can be carried out with a zero-padded FFT of size $N_\theta$ The choice to do the correlation by means of FFT has the advantage that automatically a non-uniform grid of DoA angles is tested, with a more dense grid for DoA angles around $\theta$=0 and a less dense grid for DoA angles around $\theta = \pm\pi/2$. In FIG. 4, it is shown how the snapshot of a 2×4 MRA MIMO array has to be inserted in the input of an FFT. A 2×4 MRA MIMO radar array leads to a non-uniform virtual array with 8 elements. As mentioned above, this virtual array has virtual elements at relative positions $(d_1, \ldots, d_8)$=(0, 1, 4, 6, 13, 14, 17, 19)$\lambda/2$. The FFT can also be used to increase the density of the search grid by appending zeros after the last antenna element. A typical choice for the FFT length is $N_\theta$=256, such that the output of the FFT represents the correlation of the snapshot with $N_\theta$=256 beamsteering vectors.

Step 3: For small K (e.g. K=2 or 3), $(A^H A)^{-1}$ can be easily symbolically pre-calculated. It is a matrix of size K×K.

Therefore, inversion of a K×K matrix is not carried out in the inner loop of the DML algorithm and is replaced by substitution of the appropriate values in the symbolically pre-calculated matrix. For large K, symbolically pre-calculating the matrix and substituting corresponding information becomes impractical.

As an example we like to illustrate the presented idea by looking to the dual target case.

The beamsteering matrix A consists now of 2 beamsteering vectors A=$a_k a_n$). In the core of the DML algorithm an inverse of the matrix $A^H A$ has to be calculated. As suggested above in Step 3, this inverse can be determined symbolically and we call this matrix B.

$$B = \left(A^H A\right)^{-1} = \frac{1}{N\left(1 - |\alpha_{k,n}|^2\right)}\begin{pmatrix} 1 & -\alpha_{k,n}^* \\ -\alpha_{k,n} & 1 \end{pmatrix}, \text{ where}$$

$$\alpha_{k,n} = \frac{1}{N}(\underline{a}_n^H \underline{a}_k).$$

The value $a_{k,n}$ is the in-product between 2 beamsteering vectors and can be calculated once for a specific array and stored in a Look up-Table (LUT). In general such a LUT will have size $N_\theta^2$, but if the correlation step is performed using FFT then the $a_{k,n}$ is a function of (k-n) and therefore the size of the LUT is linear with $N_\theta$ The size of the table has a gross length of $2N_\theta$ and by exploiting symmetries one can reduce its size to $N_\theta/2$.

Figure 5:
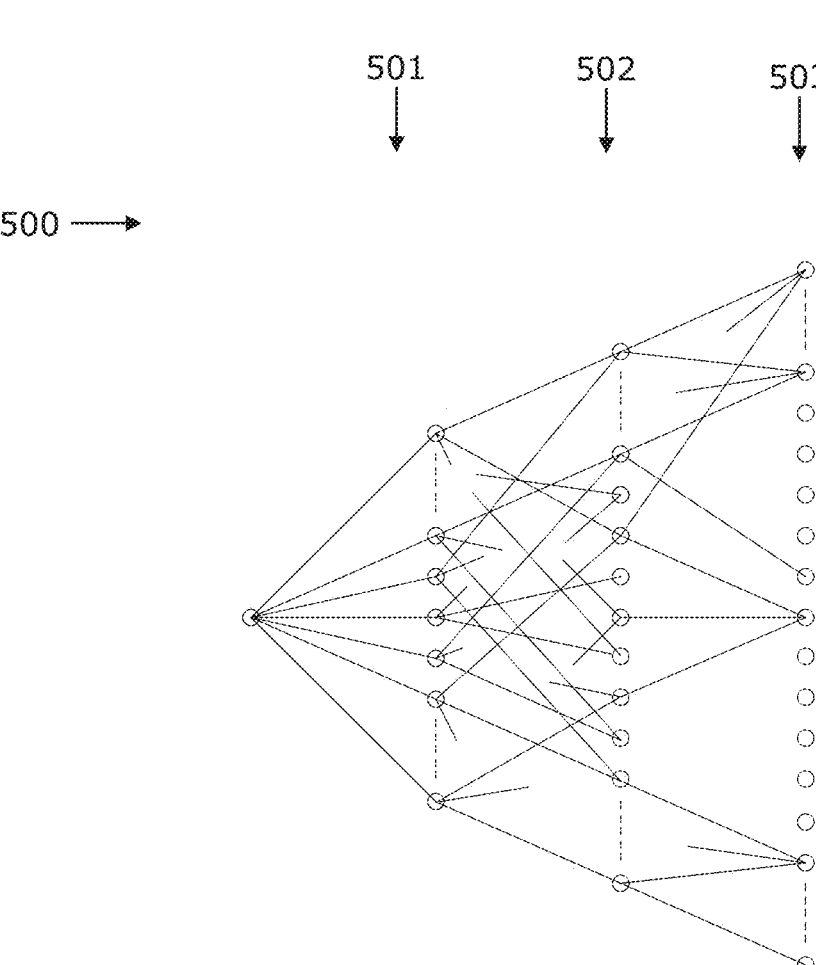
FIG. 5 shows an search tree representing the possible evaluations of the objective function, wherein each node represents a combination of direction-of-arrival angles for one or more targets and wherein the nodes are arranged in layers, wherein each layer in the tree represents a particular number of targets that are considered.

Example FIG. 5 shows an search tree 500 wherein the nodes represent the possible evaluations of the objective function with the different combinations of the DoA angles. A first layer 501 shows the candidate DoA angles when it is proposed that there is one target and therefore K=1. A second layer 502 of nodes shows the different possible combinations of DoA angles for when it is proposed there are two targets comprising a first and second target. The third layer 503 of nodes represents the different possible combinations of DoA angles for three targets (K=3) and thus illustrates all the combinations of possible DoA angles for a first, second and third target.

We will now describe a recursive process which may be performed by the apparatus 101.

The K=1 branches in layer 501 represent the calculation of the beamforming spectrum, i.e. the DML search for a single target on search grid of points of size $N_\theta$. The $N_\theta$ nodes represent the $N_\theta$ values of the beamforming spectrum, which can be used to find the most likely target in the case that one target is present in the input dataset representing the amplitude and phase of reflected radar signals. The next layer 502 (K=2) consists of $$\binom{N_\theta}{2}$$

nodes and therefore represents the DML objective function evaluated on all possible combinations of two possible DoA angles. In prior-art DML search, the search for K=1, K=2, K=3 is sequentially carried out, with only re-use of the beamforming results as determined for K=2. Hence, the lines between second layer 502 (K=2) and the third layer 503 (K=3) is not something that is present in state-of the art DML solutions.

The proposed algorithm performed by the apparatus 101 is based on a recursive formulation of the DML objective function. It will be appreciated that an objective function may be represented in many different ways depending on the algebraic formulations used. Thus, we provide below an example formulation that may be processed recursively but other formulations are possible.

Assume that the DML objective function is calculated for a set of DoA angles [$\theta_1$, $\theta_2$, . . . , $\theta_K$] (K targets) and now you want to calculate the DML objective for an extra target $\theta_{K+1}$. The K targets can be associated with K beamsteering vectors A=[$\underline{a}_1$ . . . $\underline{a}_K$] and the DML objective function can be calculated with $f(\pi_A,\underline{x})=\underline{x}^H A(A^H A)^{-1} A^H \underline{x}=\underline{y}^H (A^H A)^{-1}\underline{y}=\underline{y}^H B\underline{y}$, where $\underline{y}=A^H\underline{x}$ and $B=(A^H A)^{-1}$.

Thus, the objective function $f(\pi_A,\underline{x})$ comprises a function of two sub-functions $\underline{y}=A^H\underline{x}$ and $B=(A^H A)^{-1}$.

Assume one has determined B and wants to calculate the DML objective function for an extra target $\theta_{K+1}$ which is associated with a beamsteering vector $\underline{a}_{K+1}$. The set of beamsteering vectors can be represented with a matrix Ã= [A $\underline{a}_{K+1}$] and now we have to calculate $\tilde{B}=(\tilde{A}^H\tilde{A})^{-1}$. One can show that:

$$\tilde{B} = \begin{bmatrix} B + d\underline{c}\underline{c}^H & -d\underline{c} \\ -d\underline{c}^H & d \end{bmatrix}, \tag{1}$$

where $\underline{c}$=B $A^H\underline{a}_{K+1}$, and $$d = \frac{1}{\underline{a}_{K+1}^H\underline{a}_{K+1} - \underline{a}_{K+1}^H ABA^H\underline{a}_{K+1}}.$$

The DML objective function can now be calculated with $f(\pi_{\tilde{A}},\underline{x})=\tilde{\underline{y}}^H\tilde{B}\tilde{\underline{y}}$, where $\tilde{\underline{y}}^H=[\underline{y}^H y^*_{K+1}]$ and $y_{K+1}=\underline{a}^H_{K+1}\underline{x}$(this is the correlation of the received snapshot $\underline{x}$ with a (K+1)-th beamsteering vector $\underline{a}_{K+1}$).

By substituting former results we get $$\tilde{\underline{y}}^H\tilde{B}\tilde{\underline{y}}=\underline{y}^H B \underline{y}+d(|z|^2-2\text{Re}\{zy_{K+1}\}+|y_{K+1}|^2), \tag{2}$$

where $z=\underline{y}^H\underline{c}$.

In one or more examples, $\underline{y}^H B \underline{y}$ may be termed a Path Metric. In one or more examples, $d(|z|^2-2\text{Re}\{zy_{K+1}\}+|y_{K+1}|^2)$ may be termed a Branch Metric function. In one or more examples, $\tilde{\underline{y}}^H\tilde{B}\tilde{\underline{y}}$ may be considered to be the Path Metric of an extended path.

Thus, the branch metric function is formulated such that it comprises a function of the sub-function $\underline{y}$ (and $y_{K+1}$) in combination with the additional-target beamsteering vector $\underline{a}_{K+1}$. The additional-target beamsteering vector represents the expected response at the plurality of antenna elements of the additional-target at a proposed additional-target-first-candidate direction-of-arrival angle. The proposed additional-target-first-candidate direction-of-arrival angle may be determined by a particular search strategy or may be a predetermined angle.

It will be appreciated that this is not the only formulation of the objective function that is suitable for evaluation in a recursive manner. However, in one or more examples, this formulation or those similar to it may provide for efficient calculation of the objective function in a recursive manner.

Above we have shown how to get a recursive way of calculating the DML objective function. With such a method one can keep track of the most likely set of DoA angles as the evaluations of the objective function represented by the nodes of the tree 500 are performed. In one or more examples, we provide a strategy for traversing the tree and determining when the algorithm is finished. It should be remembered that we do not a-priori know the depth of the tree to be searched, i.e. we do not know how many targets are present in the snapshot. Therefore in one or more examples, we provide a method to:

Determine whether a path extension is likely to be valid and worthwhile to explore (moving from one layer 502 for example to a further layer 503); that is determine if the objective function should be evaluated based on the same set of candidate direction of arrival angles but with an additional target considered; and Compare DML objective function results at different depth of the search tree 500.

In one or more examples, it has been found that sequential decoding can be used. Sequential decoding is an approximate decoding technique for codes with a large state space. In one or more examples, when the DML search uses a sequential decoding algorithm there is then a good trade-off between performance and complexity. However, rather than being a Maximum Likelihood search it becomes an estimate.

In one or more examples, the branch metric function, $d(|z|^2-2\mathrm{Re}\{zy_{K+1}\}+|y_{K+1}|^2)$, mentioned above is compared to a predetermined threshold $\lambda$, which may be termed a path extension penalty. In some examples, this may be advantageous because the DoA angle estimation problem does not have a unique solution and for that reason we favour solutions with few targets over solutions with many targets.

The DoA angle estimation problem can be translated to the search of K-targets that minimizes:

$$Q_{opt}\|\underline{x}-A\underline{s}\|^2+\lambda\|\underline{s}\|_0 \qquad (3)$$

This optimization criterium consists of 2 parts: the first part is the Mean-Square-Error ($\|\underline{x}-A\underline{s}\|^2$) and the second part ($\lambda\|\underline{s}\|_0$) may be considered a sparsity promoting penalty. In convex optimization, usually a $l_1$- or $l_2$-norm is used to favour few targets over many targets. The $l_0$-norm is more difficult to track because its non-convex behaviour, but for our DoA search algorithm it can serve as path penalty. The value for $\lambda$ should be positive in order to penalize non-sparse solution. The exact value for $\lambda$ is a trade-off between performance and computational complexity.

The objective function as formulated in (3) is a Figure-of-merit (FOM) number, i.e. the higher the better. However, in other implementations, the objective function may be formulated such that lower the FOM the better. Nevertheless, in the present example in the search for a high FOM, the path penalty $\lambda$ should be subtracted. Since, $\|\underline{s}\|_0$ is the number of non-zero entries in $\underline{s}$ and therefore equal to the hypothesized number of targets we find that with every path extension a path penalty value $\lambda$ should be subtracted from the total metric.

Thus in one or more examples we define a branch metric (which includes the branch metric function) as:

$$d(|z|^2-2\mathrm{Re}\{zy_{K+1}\}+|y_{K+1}|^2)-\lambda \qquad (4)$$

recalling that $z=\underline{y}^H\underline{c}$ and $\underline{c}=B\ A^H\underline{a}_{K+1}$, and $$d = \frac{1}{\underline{a}_{K+1}^H\underline{a}_{K+1} - \underline{a}_{K+1}^H ABA^H \underline{a}_{K+1}}.$$

As a consequence, in one or more examples, if $$d(|z|^2-2\mathrm{Re}\{zy_{K+1}\}+|y_{K+1}|^2)<\lambda$$

there is no increase in the FOM in the determination of the path metric of the extended path and therefore extending the path has no benefit and should not be carried out.

The search tree can be pruned at that node and path search should continue with one or more different DoA angles. At a certain moment, all path extensions are explored and the algorithm completes with returning the set of DoA angles that can be associated with the node with the highest FOM.

Thus, to summarise, the apparatus 101, comprising the processor 102 which may be associated with any required memory, is configured to:

receive the input dataset $\underline{x}$ indicative of the amplitude and phase of radar signals received at a plurality of antenna elements, wherein the radar signals have reflected from an unknown number of targets; and determine the objective function $Q_{opt}$, based on the input dataset, for evaluation over a plurality of points of a search space, the points of the search space representing possible direction-of-arrival angles of said radar signals from the plurality of targets and wherein evaluation of the objective function is indicative of the correspondence between the possible direction-of-arrival angles of said plurality of targets and the input dataset. Put another way, the output of the evaluation of the objective function may be a figure of merit indicative of the degree to which the proposed direction-of-arrival angles are those that would cause the input dataset to be received.

The search over the possible DoA angles of the search space for each of the candidate number of targets is now performed by the processor being configured to:

evaluate the objective function $Q_{opt}$ for a first candidate number of targets K, such as at least K=2 targets, wherein each target of the first candidate number of targets has a respective first candidate direction-of-arrival angle each corresponding to a point in the search space.

The branch metric function is then evaluated based on a second candidate number of targets (K+1) comprising one more target than the first candidate number of targets. The branch metric function may comprise a function of the respective first candidate direction-of-arrival angles of the first candidate number of targets and an additional-target at an additional-target-first-candidate direction-of-arrival angle. The branch metric function may be considered a prediction that the addition of an additional-target to the first candidate number of targets will lead to a greater figure of merit. In particular, the branch metric function may represent the change to the evaluation of the objective function caused by the addition of the additional-target.

If the branch metric function is greater than the predetermined threshold $\lambda$, then the processor is configured to move to the deeper layer in the tree, that is the layer with one more target considered. The processor 102 then evaluates the objective function for the second candidate number of targets, that is K+1 targets. The evaluation is based on the original K targets maintaining their respective first candidate direction-of-arrival angles and with the addition of the further, K+1th, target having an additional-target-first-candidate direction-of-arrival angle.

However, if the branch metric function is less than the predetermined threshold $\lambda$, then the processor is configured to evaluate the objective function for the first candidate number of targets K, that is not proceed to a deeper layer of the tree 500. Instead, the evaluation is based on at least one of the first candidate number of targets K being given a different, second candidate direction-of-arrival angle. In other examples, the objective function is evaluated with more than one of the K targets, or all of the K targets having a different, second candidate direction-of-arrival angle. In this instance, the search progresses to a different node in the same layer e.g. layer 502 in the tree 500.

One can imagine that the larger the predetermined threshold or "path penalty", the less nodes in the search tree 500 will be visited. This has been tested with the number of targets per snapshot being four and the search tree also confined to a depth of four targets. Setting the predetermined threshold to zero, $\lambda=0$, a full search of every node in the tree is achieved. For a discrete search grid of points of size 256, $1.8\times10^8$ nodes have to be analyzed to find the most likely set of four DoA angles. By increasing, for example, the path penalty to $\lambda=3$, the average number of visited nodes (over 10000 experiments) decreases to $1.4\times10^7$. In another example test scenario, the number of targets per snapshot is three and the search tree is confined to a depth of three. Full search requires visiting of $2.8\times10^6$ nodes, while with $\lambda=3$, the average number of visited nodes decreases to $3.1\times10^5$. It will be appreciated that setting of the predetermined threshold represents a trade-off. Thus, increasing the predetermined threshold will reduce the computational complexity but the accuracy of the estimated DoA angle relative to the true DoA angle may decrease and the probability of not detecting a target (mis-detection probability) may increase.

In one or more further examples, instead of the FOM-metric example explained above, one can also carry out the DoA search with a metric based on equation (3).

In one or more examples, the root of the tree one starts with a metric $M_0=\|\underline{x}\|^2$ and with each increase in the candidate number of targets (or "path extension") adds a branch metric $\lambda-d(|z|^2-2\mathrm{Re}\{zy_{K+1}\}+|y_{K+1}|^2)$. With such an approach the metric should decrease with every path extension.

For the recursive calculation of B one starts with $B=1/N$ (N being the number of antennas) at layer 501, where $K=1$. This can be used for calculating B for $K=2, 3, \ldots$ etc. targets.

In one or more examples, the process followed when the candidate number of targets is increased (a so called "path extension part") may be summarized as follows:

Assume that we are at a certain node in tree 500 (wherein a node represents a set of candidate direction-of-arrival angles at a particular candidate number of targets) and have Path variable A (K candidate beamsteering vectors representing the candidate DoA angles that are hypothesized at the node), Path variable (or sub-function) B Path variable $\underline{y}$ (Correlation of the input dataset or snapshot with the K beamsteering vectors, termed a sub-function above)

Path metric representing the FOM or metric of the path that ends in the node

The path is proposed to be extended with a DoA angle (an additional-target-first-candidate direction-of-arrival angle) that is represented with a beamsteering vector $\underline{a}_{K+1}$ The following calculations are done—

$\underline{c}=B\ A^H\underline{a}_{K+1}$. Note that $A^H\underline{a}_{K+1}$ can be read from a Look-up-Table (LUT), they are the corresponding $a_{k,n}$ values as defined before:

$$\alpha_{k,n} = \frac{1}{N}(\underline{a}_n^H\ \underline{a}_k).$$

$$d = \frac{1}{\underline{a}_{K+1}^H\underline{a}_{K+1} - \underline{a}_{K+1}^H ABA^H\underline{a}_{K+1}}.$$

The part B $A^H\underline{a}_{K+1}$ is available from previous calculation, $\underline{a}^H_{K+1}A$ can also be read from the LUT and $\underline{a}^H_{K+1}\underline{a}_{K+1}$ is equal to N.

$z=\underline{y}^H\underline{c}$

Total branch metric $d(|z|^2-2\mathrm{Re}\{zy_{K+1}\}+|y_{K+1}|^2)-\lambda$

If the total branch metric is smaller than 0, then the explored path extension is not promising and should be terminated. One or more of the candidate DoA angles should be changed and the objective function should be re-evaluated.

If the total branch metric is larger than 0, then the path extension is promising and the path variables and path metric can be updated $\tilde{A}=[A\ \underline{a}_{K+1}]$ $$\tilde{B} = \begin{bmatrix} B + d\underline{c}\underline{c}^H & -d\underline{c} \\ -d\underline{c}^H & d \end{bmatrix}$$

$\tilde{\underline{y}}^H=[\underline{y}^H y^*_{K+1}]$

Figures 6, 7:
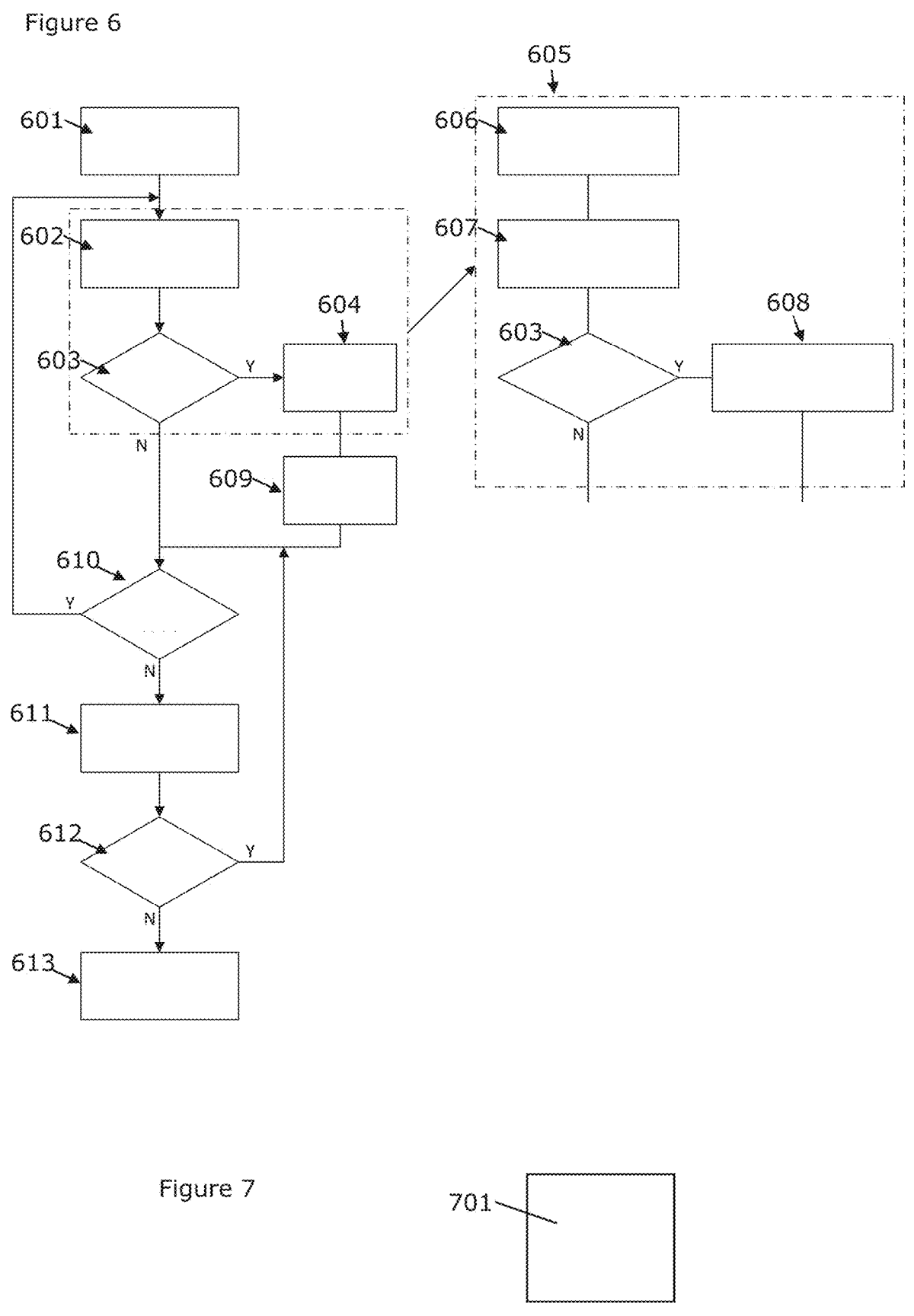

Path Metric (new node)=Path metric (old node)+d $(|z|^2-2\mathrm{Re}\{zy_{K+1}\}+|y_{K+1}|^2)-\lambda$ FIG. 6 shows an example flowchart illustrating one example way of implementing the recursive search.

Step 601 comprises the start of the algorithm. The depth in the tree starts at 1, i.e. a proposal that there is one target. Evaluation of the objective function may be performed, or a correlation, to determine the possibility of one target causing the input dataset.

Step 602 comprises the processor being configured to next consider the extension of the depth. i.e. to $K=2$. As mentioned previously, this may be assessed by determination of a branch metric.

Step 603 represents the comparing of the branch metric to the predetermined threshold.

Step 604 shows the branch metric being greater than the threshold which determinative in the algorithm making further evaluations of the objective function with the additional target. Step 604 also shows the recalculation of the path variables.

Steps 602, 603 and 604 are shown in more detail in the box 605. Thus, step 603 comprises the more detailed steps 606 and 607. Step 606 comprises calculating A, B and $\underline{y}$ and the path metric.

Step 607 shows calculating $\underline{c}$, d, z and the branch metric.

Step 608 shows calculating of $\tilde{A}$, $\tilde{B}$ and $\underline{y}$ for the greater number of candidate number of targets.

Step 609 comprises a step after step 608 and represents the depth in the tree being increased by one, that is with an additional target being considered.

Step 610 is arrived at from step 609 or step 603 (if the branch metric is less than the threshold). Step 610 comprises the processor 102 determining if there are any other combinations of candidate angles to evaluate at the current depth. If yes, they are evaluated and the method proceeds to step 602. If not, the method proceeds to step 611 in which the method proposes there is only less target, that is decreasing the current depth in the tree by one target.

The evaluation of the objective function at different candidate angles can now be performed.

Step 612 shows a determination of whether the search of the tree has completed, i.e. arrived at depth=0. If not, the method proceeds to step 610. If so, the method proceeds to step 613 in which the candidate DoA angles (and candidate number of targets) that resulted in the greatest (or smallest, if formulated such) evaluation of the objective function are output.

Thus, to summarise, in FIG. 6, the DoA estimation with sequential search and recursive DML is shown. This is just one way to use the proposed recursive calculation of the DML objective function. With this approach a single path is explored at a time. During the search, the best path so far will be tracked and as soon as no path extensions are available for further exploration the algorithm will terminate and output the set of DoA angles associated to the best path.

To limit the number of calculations it is convenient to have a Look Up Table (LUT) available containing the values $$\alpha_{k,n} = \frac{1}{N}(\underline{a}_n^H \, \underline{a}_k).$$

These values depend on the used antenna array and the chosen search grid. This LUT can be an 1-Dimensional table when the DoA angles $\theta$ to search for are chosen on grid that is uniform in $\sin(\theta)$. Furthermore, the correlation of the received snapshot $\underline{x}$ with all possible beamsteering vectors can be carried out prior to the search in order to avoid recalculating these values multiple times during the search, i.e. the values $y_k = \underline{a}_k^H \underline{x}$ for each possible beamsteering vector $a_k$, (and therefore DoA angle) can be calculated before the search starts (e.g. with use of FFT) and stored in a LUT such that they can be retrieved when a path extension has to be processed.

It will be appreciated that one or more alternative embodiments are possible. For example, the branch metric and predetermined threshold may be configured to perform a full tree search up to a certain depth (i.e. a predetermined maximum number of targets=$K_{max}$).

The apparatus may be configured to keeping track of best paths for different depths in the tree 500, not only the best overall path. Thus, the best evaluation of the objective function for the various depths may be determined. Sequential search with maximum depth. Because of antenna imperfections it becomes difficult to reliably estimate DoA angles beyond a number of targets (e.g. K=3 or 4).

The predetermined threshold $\lambda$ is in principle a value that depends on the Signal to Noise Ratio and is fixed. In other examples, the predetermined threshold A may be based on the candidate number of targets being considered, or, put another way, the current depth in tree 500. At increasing depth it becomes more difficult to differentiate between proper and false path extension. Therefore it might be beneficial to apply different path penalty values at different depths of the tree.

Along with the path variables one can calculate for each node also a pseudo-spectrum. This can be done recursively as well. The pseudo-spectrum is the set of complex amplitudes that can be associated with the DoA angles that are hypothesized in a node, i.e. along with estimated DoA angles they provide an estimate of the complex amplitudes of the targets. The pseudo-spectrum is given by $\underline{s} = B \, \underline{y}$. Hence, the pseudo-spectrum update after successful path extension is $\tilde{\underline{s}} = \tilde{B} \, \tilde{\underline{y}}$, which after substitution gives $$\tilde{\underline{s}} = \begin{pmatrix} \underline{s} - s\underline{c} \\ s \end{pmatrix}, \text{ where } s = d(y - z^*). \tag{5}$$

Computational Complexity

The computational complexity of a recursive formulation of DML as proposed in this disclosure is as follows. First we have the unconditional path extension exploration from a K-target node to a K+1-target node, i.e. the branch metric calculation. This involves 4 steps Calculation of: $c = B \, A^H \underline{a}_{K+1}$. Note that $A^H \underline{a}_{K+1}$ can be read from a Look-up-Table (LUT), they are the corresponding $a_{k,n}$ values as defined before:

$$\alpha_{k,n} = \frac{1}{N}(\underline{a}_n^H \, \underline{a}_k)$$

and form together a K-dimensional vector. This vector is multiplied with the K×K matrix B. Complexity is $K^2$ complex multiplications and $K(K-1)$ complex additions.

Calculation of: $1/d = N - \underline{a}_{K+1}^H A c$. Note $\underline{a}_{K+1}^H A$ can also be read from the alpha LUT. Hence the calculation involves an inner-product of 2K-dimensional vectors and one subtraction. The complexity involved is K complex multiplications and K complex additions (Note that d is a real value).

The calculation of: $z = \underline{y}^H c$. This is an inner-product as well: K complex multiplications and K−1 complex additions.

The calculation of the total branch metric: $d(|z|^2 - 2\text{Re}\{z \, y_{K+1}\} + |y_{K+1}|^2) - \lambda$. The cost is (less than) 3 complex multiplications 3 (real) additions and one division by $1/d$.

In the present algorithm, the path extension is explored further when the branch metric is >0. Hence there are unconditional calculations (branch metric) and conditional calculations. If the branch metric is >0, the following calculations are carried out $\tilde{A} = [A \, \underline{a}_{K+1}]$. This is not really a calculation but rather a book-keeping action.

$$\tilde{B} = \begin{bmatrix} B + d\underline{c}\underline{c}^H & -d\underline{c} \\ -d\underline{c}^H & d \end{bmatrix}.$$

Using the property that $\tilde{B}$ is Hermitian, the total complexity is $K(K-1)/2$ multiplications, $(K-1)(K+2)/2$ scalings and $K(K-1)/2$ complex additions $\tilde{\underline{y}}^H = [\underline{y}^H \underline{y}^*_{K+1}]$. This is not really a calculation but rather a proper book-keeping action.

Path Metric (new node)=Path metric (old node)+$d(|z|^2 - 2\text{Re}\{z \, y_{K+1}\} + |y_{K+1}|^2) - \lambda$. The cost is one (real) addition.

Summarizing we have per (K+1)-target node:
$2K^2 + 2K + 2$ complex multiplications
$(3K^2 - K + 6)/2$ complex additions This is a worst case calculation assuming that both the conditional and unconditional calculations are carried out and counting real multiplications and real additions as complex operations. One can translate the computations to a K-target node by substituting K−1 in the expressions
$2K^2 - 2K + 2$ complex multiplications
$(3K^2 - 7K + 10)/2$ complex additions The complexity of the direct method consists of 2 parts Calculation of $\tilde{B}$. This is the inversion of a K×K complex matrix. Using Gaussian Elimination, the complexity involves $(2K^3 + 3K^2 - 5K)/6$ complex multiplications, $(2K^3 + 3K^2 - 5K)/6$ complex additions and $K(K+1)/2$ complex divisions. A complex division can be written as a complex multiplication and a scaling. Therefore we count them as complex multiplications as well. Total complexity is therefore $(K^3+3K^2-K)/3$ complex multiplications and $(2K^3+3K^2-5K)/6$ complex additions.

After calculation of $\tilde{B}$, one has to pre-multiply the resulting matrix with $\tilde{y}^H$ and post-multiply with $\tilde{y}$. This is multiplication of a K-dimensional vector with K×K matrix, followed by an inner-product of 2K-dimensional vectors. The complexity involved is $K^2+K$ complex multiplications and $K^2-1$ complex additions.

Summarizing we have per K-target node evaluation: $(K^3+6K^2+2K)/3$ complex multiplications $(2K^3+9K^2-11K)/6$ complex additions The method and processor described herein can be easily extended for a 2D antenna array by deriving the beamforming spectrum in the same way but in 2-dimensions.

FIG. 7 shows an example computer program product, such as a non-transitory computer program product, comprising computer program code which, when executed by the processor 102 of the apparatus 101 causes the apparatus 101 to perform the method described herein also as exemplified in FIG. 6. The computer program product may comprise an aspect of the disclosure.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/ method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. λ processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising a processor configured to:

receive, via an antenna array comprising a plurality of antenna elements, an input dataset indicative of an amplitude and phase of radar signals received at the plurality of antenna elements, wherein the radar signals have reflected from an unknown number of targets;

determine an objective function, based on the input dataset, for evaluation over a plurality of points of a search space, the points of the search space representing possible direction-of-arrival angles of said radar signals from the plurality of targets and wherein evaluation of the objective function is indicative of the correspondence between the possible direction-of-arrival angles of said plurality of targets and the input dataset;

evaluate the objective function for a first candidate number of targets K, wherein each target of the first candidate number of targets has a respective first candidate direction-of-arrival angle, each corresponding to a point in the search space;

perform a first evaluation of a branch metric function based on a second candidate number of targets, K+1, comprising one more targets than the first candidate number of targets, wherein the branch metric function is indicative of a change in the objective function between an evaluation of the objective function based on the first candidate number of targets having the first candidate direction-of-arrival angles and an evaluation of the objective function based on the second candidate number of targets, and comprises a function of the respective first candidate direction-of-arrival angles of the first candidate number of targets; and if the branch metric function is greater than a predetermined threshold λ, then the processor is configured to:

evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising an additional-target having an additional-target-first-candidate direction-of-arrival angle;

if the branch metric function is less than the predetermined threshold λ, then the processor is configured to:

evaluate the objective function for the first candidate number of targets K, wherein the evaluation is based on at least one of the first candidate number of targets K having a different, second candidate direction-of-arrival angle; and generate, at the processor, a final set of direction-of-arrival angles that comprises the direction-of-arrival angles that resulted from the evaluation of the objective function.

2. The apparatus of claim 1, wherein predetermined threshold $\lambda$ is based on the candidate number of targets.

3. The apparatus of claim 1, wherein the objective function is formulated such that the evaluation of the objective function for the first candidate number of targets K comprises a function of two or more sub-functions, and wherein the branch metric function comprises a function of at least one of the two or more sub-functions and an additional-target beamsteering vector, the additional-target beamsteering vector representing the expected response at the plurality of antenna elements of the additional-target at the additional-target-first-candidate direction-of-arrival angle.

4. The apparatus of claim 1, wherein the processor is configured to, if the branch metric function is less than the predetermined threshold $\lambda$, not evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising the additional-target having the additional-target-first-candidate direction-of-arrival angle and any other direction-of-arrival angle in the search space.

5. The apparatus of claim 1, wherein the branch metric function is also a function of the additional-target-first-candidate direction-of-arrival angle, comprising the angle of said one more target than the first candidate number of targets, wherein the additional-target-first-candidate direction-of-arrival angle comprises any angle in the search space.

6. The apparatus of claim 1, wherein when the branch metric function is less than the predetermined threshold $\lambda$ and the processor has evaluated the objective function for the first candidate number of targets K, wherein the evaluation is based on at least one of the first candidate number of targets K having a different, second candidate direction-of-arrival angle; and the processor is configured to:
re-evaluate the branch metric function based on the second candidate number of targets, K+1, comprising one more target than the first candidate number of targets, wherein the branch metric function is a function of the candidate direction-of-arrival angles of the targets of the evaluated objective function comprising those that changed to said different, second candidate direction-of-arrival angle and those that remained as the first candidate direction-of-arrival angles.

7. The apparatus of claim 1, wherein the processor is configured to, as part of said evaluation of the objective function for the first candidate number of targets K and the first evaluation of the branch metric function:

determine a beamsteering matrix, A, of beamsteering vectors wherein each beamsteering vector represents a respective one of the first candidate number of targets K and wherein each beamsteering vector comprises a function that represents the expected response at the plurality of antenna elements from radar signals of unit amplitude reflected from a respective one of the targets at a respective one of the first candidate direction-of-arrival angles;

determine a sub-function B wherein $B=(A^H A)^{-1}$ determine a sub-function $\underline{y}$, wherein $\underline{y}=A^H\underline{x}$ and $\underline{x}$ represents the input dataset and wherein $\underline{y}$ represents a correlation of the input dataset with the beamsteering vectors of the beamsteering matrix;

define the additional-target having the additional-target-first-candidate direction-of-arrival angle as a beamsteering vector, $\underline{a}_{K+1}$;

calculate $\underline{c}$ wherein $c=B\ A^H\underline{a}_{K+1}$;

calculate $\bar{d}$, wherein $$d = \frac{1}{\underline{a}_{K+1}^H \underline{a}_{K+1} - \underline{a}_{K+1}^H ABA^H \underline{a}_{K+1}};$$

calculate z, wherein $z=\underline{y}^H\underline{c}$;

and wherein the branch metric function comprises $d(|z|^2-2\ \text{Re}\{z\ y_{K+1}\}+|y_{K+1}|^2)$ and is compared to the predetermined threshold.

8. The apparatus of claim 7, wherein the processor is additionally configured to, if the branch metric function is greater than the predetermined threshold $\lambda$:

calculate $\tilde{A}=[A\ \bar{a}_{K+1}]$ comprising the beamsteering matrix for the second candidate number of targets and for use in a subsequent calculation of the branch metric function;

calculate $$\tilde{B} = \begin{bmatrix} B + d\underline{c}\underline{c}^H & -d\underline{c} \\ -d\underline{c}^H & d \end{bmatrix}$$

for use in a subsequent calculation of the branch metric function; and calculate $\tilde{\underline{y}}^H=[\underline{y}^H y^*_{K+1}]$ for use in a subsequent calculation of the branch metric function.

9. The apparatus of claim 7, wherein the evaluation of the objective function comprises the repeated evaluation of the objective function for a plurality of candidate matrices based on matrix A that each include different direction-of-arrival-angle vectors over the respective search space, wherein said set of direction of arrival angles are derived from one of the candidate matrices of the plurality of candidate matrices that provides one of a maximum and a minimum evaluation of the objective function over the search space.

10. The apparatus of claim 1, wherein the apparatus comprises a frequency-modulated-continuous-wave, FMCW, radar system having an antenna array comprising the plurality of antenna elements, the plurality of antenna elements coupled to the processor.

11. The apparatus of claim 1, wherein the input dataset comprises a dataset that has been Range-Doppler processed such that the input dataset is representative of radar signals that have reflected from targets at a predetermined range of distances from the antenna elements and a predetermined range of radial velocities relative to the antenna elements.

12. The apparatus of claim 1, wherein the objective function is formulated such that the greater a value obtained upon its evaluation, the greater a probability that the possible direction-of-arrival angles used in its evaluation are those that resulted in the receipt of the input dataset and wherein said evaluation of the objective function in the first evaluation and the second evaluation is configured to maximize the objective function.

13. The apparatus of claim 1, wherein the objective function is formulated such that the lesser a value obtained upon its evaluation, the greater a probability that the possible direction-of-arrival angles used in its evaluation are those that resulted in the receipt of the input dataset and wherein said evaluation of the objective function in the first evaluation and the second evaluation is configured to minimize the objective function.

14. A method for evaluating an objective function, the method, performed by a processor coupled to an antenna array comprising a plurality of antenna elements, the method comprising:

receiving, via the antenna array, an input dataset indicative of an amplitude and phase of radar signals received at the plurality of antenna elements, wherein the radar signals have reflected from an unknown number of targets;

determining an objective function, based on the input dataset, for evaluation over a plurality of points of a search space, the points of the search space representing possible direction-of-arrival angles of said radar signals from the plurality of targets and wherein evaluation of the objective function is indicative of the correspondence between the possible direction-of-arrival angles of said plurality of targets and the input dataset;

evaluating the objective function for a first candidate number of targets K, wherein each target of the first candidate number of targets has a respective first candidate direction-of-arrival angle, each corresponding to a point in the search space;

performing a first evaluation of a branch metric function based on a second candidate number of targets, K+1, comprising one more target than the first candidate number of targets, wherein the branch metric function is indicative of a change in the objective function between an evaluation of the objective function based on the first candidate number of targets having the first candidate direction-of-arrival angles and an evaluation of the objective function based on the second candidate number of targets, and comprises a function of the respective first candidate direction-of-arrival angles of the first candidate number of targets; and if the branch metric function is greater than a predetermined threshold λ:

evaluating the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising an additional-target having an additional-target-first-candidate direction-of-arrival angle;

if the branch metric function is less than the predetermined threshold λ:

evaluating the objective function for the first candidate number of targets K, wherein the evaluation is based on at least one of the first candidate number of targets K having a different, second candidate direction-of-arrival angle; and generating a final set of direction-of-arrival angles that comprises the direction-of-arrival angles that resulted from the evaluation of the objective function.

15. The method of claim 14, wherein the objective function is formulated such that the evaluation of the objective function for the first candidate number of targets K comprises a function of two or more sub-functions, and wherein the branch metric function comprises a function of at least one of the two or more sub-functions and an additional-target beamsteering vector, the additional-target beamsteering vector representing the expected response at the plurality of antenna elements of the additional-target at the additional-target-first-candidate direction-of-arrival angle.

16. The method of claim 14, wherein the processor is configured to, if the branch metric function is less than the predetermined threshold λ, not evaluate the objective function for the second candidate number of targets K+1, wherein the evaluation is based on the first candidate number of targets, K, of the second candidate number of targets, K+1, having the respective first candidate direction-of-arrival angles and the remaining target of the second candidate number of targets, K+1, the remaining target comprising the additional-target having the additional-target-first-candidate direction-of-arrival angle and any other direction-of-arrival angle in the search space.

17. A non-transitory computer readable medium comprising computer program code configured to perform the method of claim 14.

18. The method of claim 14, wherein the branch metric function is also a function of the additional-target-first-candidate direction-of-arrival angle, comprising the angle of said one more target than the first candidate number of targets, wherein the additional-target-first-candidate direction-of-arrival angle comprises any angle in the search space.

19. The method of claim 14, wherein when the branch metric function is less than the predetermined threshold and the processor has evaluated the objective function for the first candidate number of targets, wherein the evaluation is based on at least one of the first candidate number of targets having a different, second candidate direction-of-arrival angle;

the method comprises:

re-evaluating the branch metric function based on the second candidate number of targets comprising one more target than the first candidate number of targets, wherein the branch metric function is a function of the candidate direction-of-arrival angles of the targets of the evaluated objective function comprising those that changed to said different, second candidate direction-of-arrival angle and those that remained as the first candidate direction-of-arrival angles.

* * * * *